(12) United States Patent
Ponnuswamy et al.

(10) Patent No.: US 11,601,285 B2
(45) Date of Patent: Mar. 7, 2023

(54) SECURELY AUTHORIZING SERVICE LEVEL ACCESS TO A BACKUP SYSTEM USING A SPECIALIZED ACCESS KEY

(71) Applicant: EMC IP Holding Company LLC, Hopkinton, MA (US)

(72) Inventors: Senthil Ponnuswamy, San Jose, CA (US); Satish Inampudi, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 16/910,403

(22) Filed: Jun. 24, 2020

(65) Prior Publication Data
US 2021/0409227 A1 Dec. 30, 2021

(51) Int. Cl.
*H04L 9/32* (2006.01)
*H04L 9/08* (2006.01)
*H04L 9/40* (2022.01)

(52) U.S. Cl.
CPC .......... *H04L 9/3247* (2013.01); *H04L 9/0825* (2013.01); *H04L 9/3236* (2013.01); *H04L 9/3297* (2013.01); *H04L 63/105* (2013.01); *H04L 63/108* (2013.01)

(58) Field of Classification Search
None
See application file for complete search history.

(56) References Cited

U.S. PATENT DOCUMENTS

| | | | |
|---|---|---|---|
| 11,082,225 B2* | 8/2021 | Kobayashi | H04L 63/10 |
| 2005/0132231 A1* | 6/2005 | Williamson | H04L 63/083 |
| | | | 726/4 |
| 2009/0292814 A1* | 11/2009 | Ting | H04L 51/32 |
| | | | 709/229 |
| 2013/0019295 A1* | 1/2013 | Park | H04L 63/0807 |
| | | | 726/7 |
| 2015/0082420 A1* | 3/2015 | Love | H04L 63/0823 |
| | | | 726/16 |
| 2019/0156008 A1* | 5/2019 | Tamura | H04L 63/0892 |
| 2020/0076791 A1* | 3/2020 | Kishimoto | H04L 9/0825 |
| 2021/0117671 A1* | 4/2021 | Decoux | G06F 16/22 |
| 2021/0288802 A1* | 9/2021 | Muhanna | H04L 9/083 |

* cited by examiner

*Primary Examiner* — Benjamin E Lanier
(74) *Attorney, Agent, or Firm* — Dergosits & Noah LLP; Todd A. Noah

(57) ABSTRACT

Described is a system (and method) for securely authorizing service level access to a backup system using an access key. The service level access (or access via a service account) may provide a user with an enhanced set of privileges to perform troubleshooting operations on the backup system. Such privileges may be unlocked by allowing a user to perform operations using an unrestricted interface of the backup system such as an operating system shell. To authorize such access, the system may provide a limited (or specialized) access key. The access key may be narrowly tailored to only provide access to a particular backup system and only remain viable for a limited duration. Accordingly, the access key may be configured to embed a system identifier, a timestamp, and a digital signature, which may be independently verifiable by the backup system before granting service level access.

20 Claims, 5 Drawing Sheets

SECURELY AUTHORIZING SERVICE LEVEL ACCESS TO A BACKUP SYSTEM USING A SPECIALIZED ACCESS KEY

TECHNICAL FIELD

This disclosure relates to managing access to systems, and more particularly, authorizing enhanced access to a system using a specialized access key.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As part of managing such a data storage service, providers may implement security measures to preserve the integrity of backup data. These security measures may include managing the privileges provided to customer user accounts associated with the backup infrastructure. For example, privileges that allow access to certain service tools may be tightly controlled to prevent irreversible damage to the backup data or exploitation by a malicious party. For example, these service tools may allow a user to perform certain operating system commands for underlying backup system components. Such service tools, however, may be required by customers or support agents associated with the providers of the backup infrastructure to troubleshoot various backup system components when issues arise. Accordingly, there is a continued need to allow users to access such service tools when necessary while sill managing the potential security risks to backup infrastructure.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
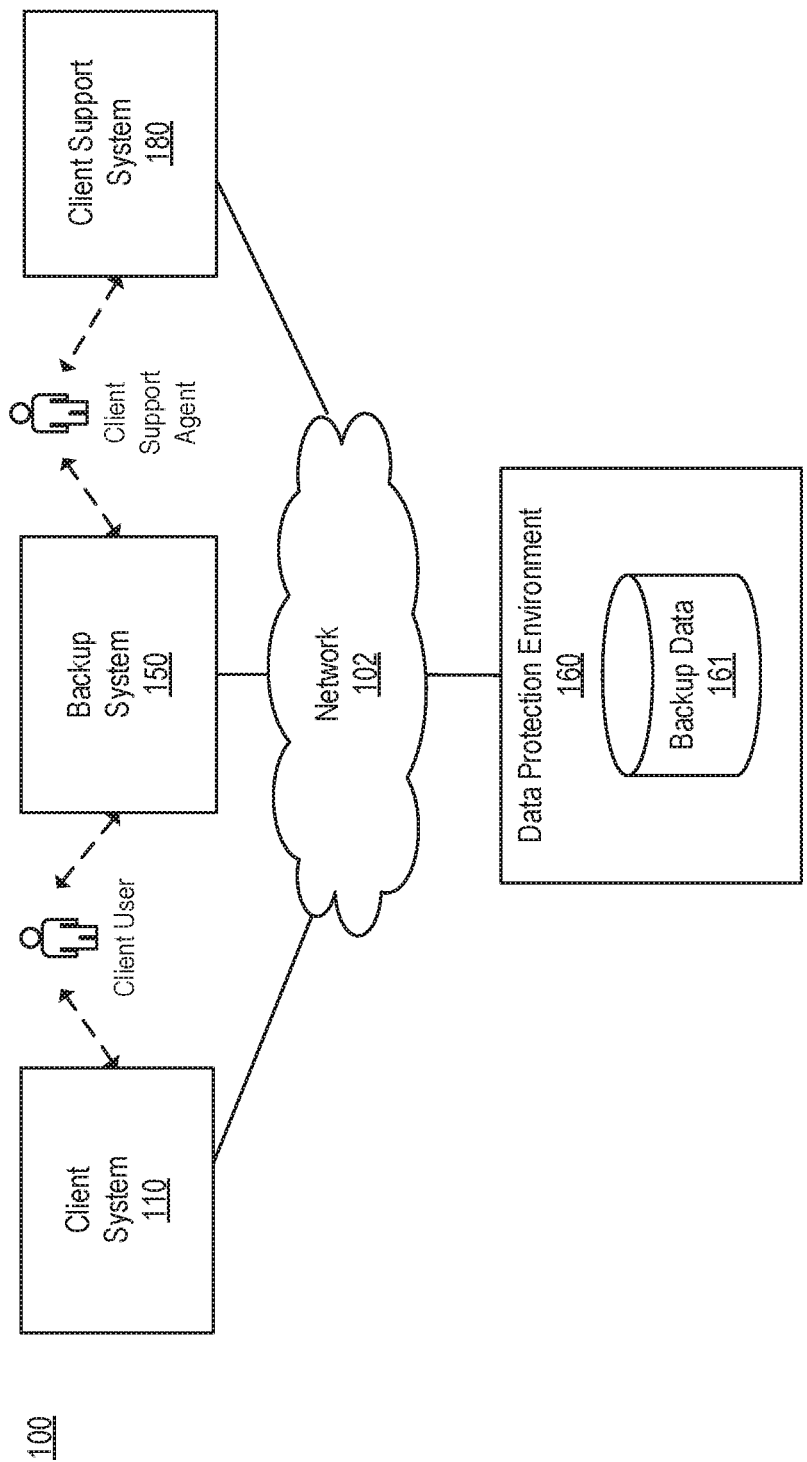
FIG. 1 is a block diagram illustrating an example operating environment for securely authorizing service level access to a backup system according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for securely authorizing service level access to a backup system using a limited access key. For example, service level access (or access via a service account) may provide a user with an enhanced (or unrestricted) set of privileges to perform various troubleshooting operations on the backup system. In some embodiments, such privileges may be unlocked by allowing a user to perform operations (e.g. execute commands) using an unrestricted interface of the backup system such as an operating system shell. To authorize such service level access in a secure and controlled manner, the system may provide a limited (or specialized) access key. As further described herein, in some embodiments, the access key may be configured to satisfy a certain set of criteria. First, the access key may be sufficiently secure such that it cannot be feasibly reverse engineered even if a user acquires multiple access keys over a period of time. Second, the access key may be narrowly tailored to only provide access to a particular backup system and only remain viable for a limited duration. To satisfy such criteria, the access key may be embedded with certain information verifiable by the backup system. In addition, digital signatures and asymmetric encryption technologies may be leveraged to ensure the access key is distributed in a controlled and secure manner. For example, the access key may be configured to include a system identifier, a timestamp, and a digital signature. Accordingly, the components of the access key may be independently verifiable by the backup system before granting service level access.

To provide secure access using the access key, the backup system may receive a request for service level access from a user with a client level access. For example, the client level access may limit the user to a restricted interface (or shell) of the backup system. In response to the access request, the backup system may request the access key required for the service level access, which may be controlled by a client support system. After verifying the credentials of the user, the client support system may generate the access key and share the key access with the user. As described, the access key may be embedded with a system identifier and timestamp (e.g. message). The access key may also include a digital signature generated by the client support system by encrypting a representation (e.g. message digest) of the system identifier and the timestamp (e.g. message) with a private key. Accordingly, upon receiving the access key, the backup system may decrypt the digital signature with a corresponding public key to authenticate the access key was generated by the client support system and to verify the integrity of the contents of the embedded information. In addition, before granting service level access, the backup system may verify the system identifier included in the access key matches an unmodifiable identifier associated with the backup system, and verify the timestamp included in the access key is within a predetermined authorization time limit. Thus, the backup system may grant service level access in a secure and controlled manner.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for securely authorizing service level access to a system according to one or more embodiments of the disclosure.

As shown, the operating environment 100 may include a client system 110, a backup system 150, a data protection environment 160, and a client support system 180. It should be noted that the components of operating environment 100 may interact via a network 102, which may be any type of wired or wireless network including a local area network (LAN), a wide area network (WAN), or a direct communication link, or other suitable connection.

The client system 110 may be associated with a client (or customer) of a data protection platform and act as a client from which data to be protected (e.g. backed-up) originates. The client system 110 may host one or more client applications and may be associated with data that is stored and/or backup up to the data protection environment 160. The client system 110 may also be associated with a client user such as a backup administrator that interacts with the backup system 150.

In some embodiments, the backup system 150 may include one or more components that are associated with providing data protection and recovery services. For example, the backup system 150 may include a backup server or appliance. The backup system 150 may be an on-premises (e.g. maintained by a customer or client of the data protection and recovery services), or part of a cloud-based system provided as part of an on-demand service. The backup system 150 may direct (or control, initiate, etc.), or work in conjunction with, other components of the operating environment 100 to perform various operations as further described herein. In addition, the backup system 150 may provide an interface (e.g. application programming interface (API), graphical user interface (GUI), command line interface (CLI), etc.) that allows a user to interact with the backup system 150, or particular components thereof. In addition, the backup system 150 may manage one or more user accounts (or access levels) that have differing privileges as further described herein.

In some embodiments, the backup system 150 may include, or work in conjunction with one or more backup components including a backup application that performs (or manages, coordinates, etc.) the creation and restoration of data that may be backed-up. The backup components may include a backup appliance such as a Dell EMC CloudBoost appliance, although any suitable appliance is contemplated. In addition, the backup components may include a backup server that may be implemented in conjunction with a Data Domain deduplication storage server provided by Dell EMC for use with Data Domain™ Restorer (DDR) storage devices. In some embodiments, the backup server may be a Dell EMC Avamar server or a Dell EMC Networker server, although no particular server is required, and other backup and storage system configurations are contemplated. It should be noted that components of the backup system 150 (e.g. backup application, backup appliance, or backup server) can be implemented in various forms, such as a virtual, physical, or native public cloud appliance to fit the requirements of a particular configuration.

The data protection (or backup storage) environment (or system) 160 may store backup data (or data) 161. The data protection environment 160 may also store metadata for the backup data 161 and include one or more instances of a filesystem that catalogs files and other data residing in the data protection environment 160. In general, the storage of backup data 161 may be configured to store client system 110 data backups that can be restored in the event of a loss of data.

The client support system 180 may be associated with a provider of a data protection and recovery service associate with a customer (or client system 110). Accordingly, a user such as a client support agent associated with the client support system 180 may provide various support services for the backup system 150. For example, a client support agent (or client support system 180) may provide a specialized access key (or access code, password, etc.) authorizing a client user associated with the client system 110 to access the backup system 150 with a service account (e.g. service level access) as further described herein.

In some embodiments, to provide the ability to distribute the specialized access keys, the client support system 180 may control a private key of a public private key pair, and the backup system 150 may control a corresponding public key of the public private key pair. In some embodiments, the backup system's 150 public key may be stored in a secure manner and not be accessible to any users. It should be noted that any suitable public-private key (or asymmetric cryptography) technology may be implemented. For example, in some embodiments, an RSA (Rivest-Shamir-Adleman) encryption algorithm may be used. In addition, the public-private key pair may be generated by any suitable key generating authority.

Accordingly, the components of operating environment 100 may securely authorize access to the backup system 150 by leveraging a specialized access key as further described herein.

Figure 2:
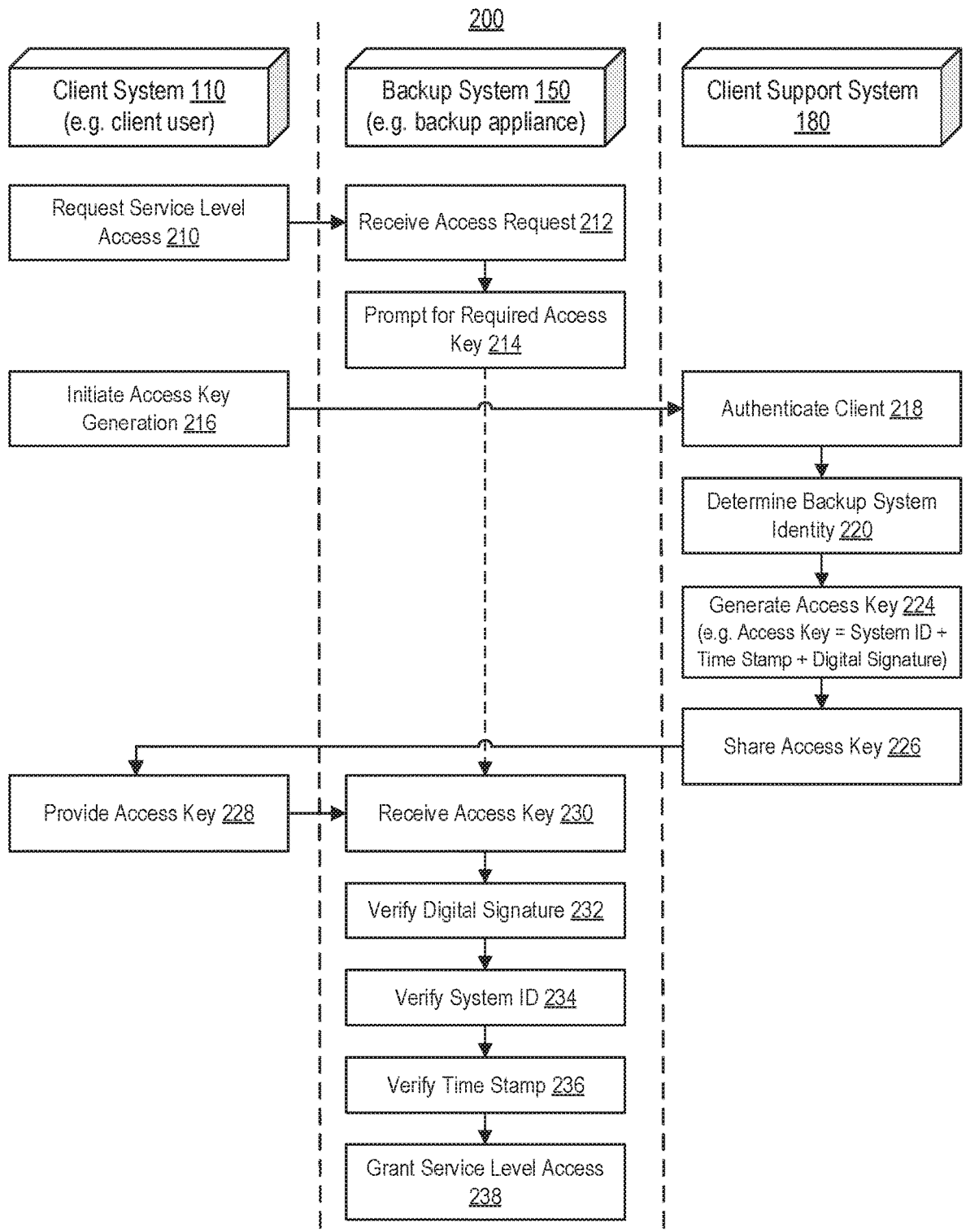
FIG. 2 is a block diagram illustrating an example interaction between components when securely authorizing service level access to a backup system according to one or more embodiments of the disclosure.

FIG. 2 is a block diagram 200 illustrating an example interaction between components when securely providing service level access to a backup system according to one or more embodiments of the disclosure.

As shown, in some embodiments, securely authorizing the service level access may include an interaction between a client system (or client) 110, a backup system 150, and a client support system 180. As shown, in 210, the client 110, or a client user associated with the client 110, may request service level access to the backup system 150. In some embodiments, the user (e.g. a backup administrator) associated with the client 110 may be authorized to access the backup system 150 using a client level access (e.g. via a client account). For example, the client level access may include a limited set of privileges allowing the user to perform various backup related operations without potentially compromising the integrity of the backup system 150. In contrast, the service level access (e.g. via a service account) may include an enhanced (or unrestricted) set of privileges such as administrative privileges required to perform certain operations on the backup system 150. For example, the service level access may authorize (or unlock, make available, etc.) access to a particular interface such as an unrestricted operating system shell. Accordingly, in order to perform various troubleshooting operations associated with the backup system 150, the user may request service level access to the backup system 150. The administrative privileges, however, may allow a user to configure (or reconfigure) various settings of the backup system 150 and potentially compromise the integrity of backup data stored by the backup system 150. Accordingly, authorizing service level access may be under the purview of a higher authority such as the client support system 180. More particularly, service level access may be controlled by the client support system 180 using a specialized access key as further described.

Continuing with the example in diagram 200, in 212, the backup system 150 may receive the access request. In some embodiments, the access request may be initiated via an interface (e.g. CLI) provided by the backup system 110 or a component that operates in conjunction with the backup system 150 (e.g. a backup application). In some embodiments, the interface associated with a user having client level access may include a limited or restricted interface. In response to the access request, in 214, the backup system 150 may prompt the user for the specialized access key. Accordingly, in 216, the client 110 may initiate a process to generate the access key. It should be noted that the client 110 may initiate the process to generate the access key access key before or after requesting service level access to the backup system 150 (e.g. block 210). As described, distribution of such an access key may be controlled by the client support system 180. Accordingly, the client 110 may request the client support system 180 to generate the required access key. For example, the user may communicate with a client support agent (or support agent) associated with the client support system 180, and the support agent may generate the specialized access key to allow the user (or the support agent) service level access to the backup system 150 for troubleshooting. However, before generating the access key, in 218, the client support system 180 (or support agent) may authenticate the client 110 (or client user). For example, the support agent may authenticate that the client user is in fact associated with the particular backup system 150 and/or has the proper credentials required for acquiring the access key. In order to generate the access key, in 220, the client support system 180 may determine the identity of the particular backup system 150 to which the user will be granted service level access. For example, as part of the process to authenticate the user, the client support system 180 may determine the user is associated with the particular backup system 150. For example, a backup administrator (or backup administrator account) may only be granted access to a backup system 150 associated with a particular client or customer.

In 224, the client support system 180 may generate the access key. As described, the access key may be configured to restrict access based on certain criteria. For example, the access key may provide access to only to a particular backup system 150, and only for a limited duration. To provide such restricted access, the access key may include (or embed, incorporate, etc.) certain information verifiable by the backup system 150. Moreover, the access key may be configured to allow the backup system 150 to detect any tampering (e.g. unauthorized modifications) to such information. An example configuration of such an access key is further described with reference to FIG. 3.

Figure 3:
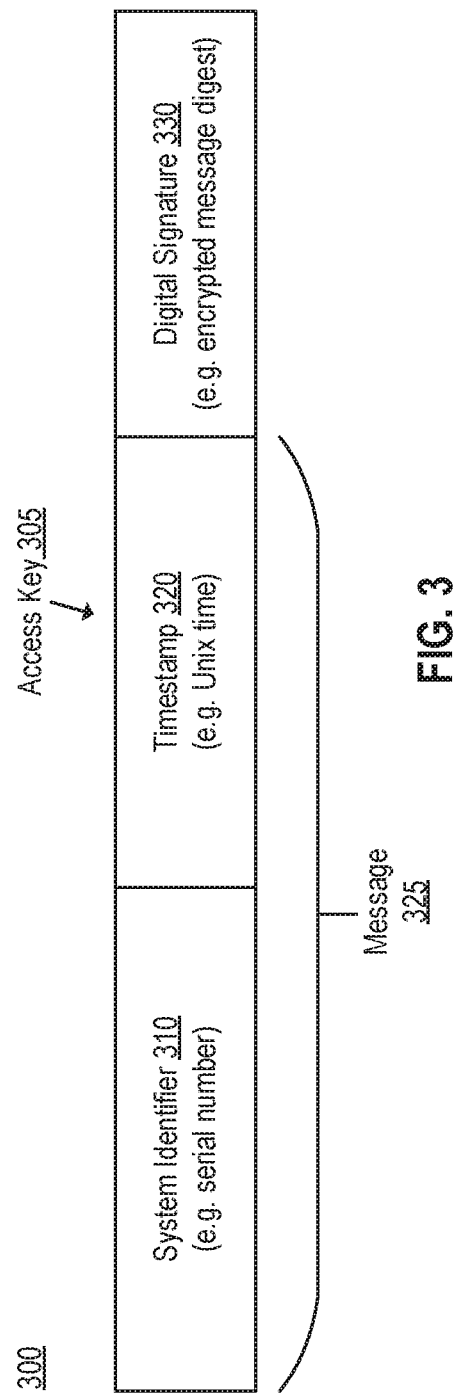
FIG. 3 is a block diagram illustrating an example configuration of a specialized access key according to one or more embodiments of the disclosure.

FIG. 3 is a block diagram 300 illustrating an example configuration of an access key 305 according to one or more embodiments of the disclosure. As shown, the access key 305 may include multiple portions (e.g. text portions). As described, the access key 305 may be configured to provide targeted access to a particular backup system and for a limited duration. Accordingly, the access key may be embedded with certain information (e.g. a message 325) verifiable by the backup system (e.g. backup system 150). More particularly, in some embodiments, the access key 305 may include a system identifier 310, a timestamp 320, and digital signature 330. The system identifier 310 may include a serial number or other information (e.g. name, address, etc.) to uniquely identify a particular backup system to which service level access may be granted. The timestamp 320 may include a point in time or duration that may be used to ensure the access key 305 is valid for a limited amount of time. This provides an additional layer of security and ensures that a generated access key may not be used indefinitely. For example, upon expiration of the access key, a user must request a new access key and thereby undergo any necessary authentication and/or verification steps required to acquire a subsequent key from the client support system (e.g. client support system 180). In some embodiments, the timestamp 320 may be associated with the creation of the access key 305. For example, the timestamp 320 may include the time at which the access key 305 is generated (or requested). As another example, the timestamp 320 may specify an expiration for the access key 305. In some embodiments, the timestamp 320 may be expressed using a UNIX time (or Epoch time, POSIX time, etc.), although any suitable method may be used.

In some embodiments, the access key 305 may also include additional portions (e.g. text portions) that may provide additional restrictions for service level access that are verifiable by the backup system. For example, the additional portions may include a particular user identifier that limits service level access to a particular user (or user account). As another example, the access key 305 may include one or more additional portions that specify particular operations that are authorized to be performed by the user submitting the access key 305. For example, the access key 305 may include an identifier for one or more operations authorized by the client support system. As with the system identifier 310 and timestamp 320, these additional pieces of information may also be represented and verifiable via the digital signature 330 as further described.

As shown, the access key 305 may also include a digital signature 330. The digital signature 330 allows the backup system to authenticate the access key is issued by the client support system, and confirm the integrity of the embedded information (or restrictions). In some embodiments, the digital signature 330 may be generated with a private key of a public-private key pair issued to the client support system. Any suitable algorithm for the digital signature may be used such as RSA-based encryption techniques. In some embodiments, the digital signature 330 may be created by encrypting a message digest of a message 325. The message digest may be created using any suitable one-way function such as a cryptographic hash function. As shown in this example, the message 325 may include the system identifier 310 and the timestamp 320. For instance, the message 325 may include the text (or bit string) created from combining (or concatenating) the system identifier 310 (e.g. first text portion) and the timestamp 320 (e.g. second text portion). Accordingly, the message digest may be the resultant hash value generated from inputting the message 325 (e.g. system identifier 310+timestamp 320) into a cryptographic hash function. Accordingly, any unauthorized modifications to either of the system identifier 310 or the timestamp 320 would invalidate the digital signature 330. It should be noted that any suitable hash function or algorithm may be used such as SHA (Secure Hash Algorithm), MP5 (Message-Digest algorithm 5), or variants thereof.

Returning to FIG. 2, once the access key is generated, in 226, the client support system 180 may share the access key with the client 110. For example, the client support system 180 may distribute the access key to the backup system 150 in a secure manner. For example, a secure protocol may be used (e.g. Transport Layer Security (TLS) protocol). In some embodiments, the access key may be encrypted by the client support system 180 using a public key of the backup system 150. The backup system 150 may then decrypt the access key with its corresponding private key. In 228, the client 110 (or user) may provide the access key to the backup system 150 for service level access (or access to a service account). It should be noted that a user (e.g. support agent) associated with the client support system 180 may also use the generated access key to the access the backup system 150. For example, the support agent may use the service level access to troubleshoot the backup system 150. For instance, the support agent may access the backup system 150 via a remote interface (or remote session) in conjunction with a user (e.g. backup administrator) associated with the client 110 to perform troubleshooting.

In 230, the backup system 150 may receive the access key. For example, the access key may be inputted by a user (e.g. backup administrator, support agent, etc.) into an interface of the backup system 150. In some embodiments, the backup system 150 may provide a limited (or restricted) interface to the user, and upon verification of the access key, provide an operating system (e.g. unrestricted) interface. For example, the operating system interface may include a shell interface (e.g. Unix shell) to access operating system commands.

Upon receiving the access key, the backup system 150 may perform multiple verifications before granting service level access to a user. In 232, the backup system 150 may first verify the digital signature. The backup system 150 may verify the digital signature to authenticate the access key and verify the contents of the access key. For example, the backup system 150 may first decrypt the digital signature with its public key that corresponds to client support system's private key, to reveal the message digest (e.g. hash value). The backup system 150 may then verify the message digest by inputting the message of the access key, which includes the system identifier (e.g. first text portion) and the timestamp (e.g. second text portion), into the same cryptographic hash function used by the client support system 180. The resultant message digest determined by the backup system 150 may then be compared to the message digest of the digital signature. If there is a match, the backup system 150 can confirm the authenticity of the access key (e.g. the access key was in fact created by the client support system 180), and the integrity of the access key (e.g. the message was not altered since being created by the client support system 180).

Once the digital signature is verified, in 234, the backup system 150 may verify the system identifier (e.g. first text portion) specified by the access key identifies the backup system 150. In other words, the backup system 150 verifies whether the access key is being submitted to obtain service level access to the correct system. For example, the backup system 150 may determine whether the system identifier of the access key matches its own serial number (or other identifier). In some embodiments, the backup system 150 may trust (or rely) on a serial number because its own serial number may be unmodifiable. For example, a user (even with administrative privileges) may not be able to modify the serial number of the backup system 150. In addition to verifying the system identifier, the backup system 150 may also verify the access key is being submitted within an authorized amount of time. Accordingly, in 236, the backup system 150 may verify the timestamp included within the access key. For example, the backup system 150 may verify the timestamp is within a predetermined authorization time limit (e.g. current time−timestamp<time limit).

Once the backup system 150 has completed the necessary verifications, in 238, the backup system 150 may grant service level access the user. In some embodiments, granting service level access may include authorizing the user to perform operations beyond a client level access by unlocking an operating system or configuration interface for the backup system 150, thus allowing the user to perform certain administrative commands. However, if any of the verifications fails (e.g. operations 232, 234, or 236), the system may deny the service level access to the user.

Figure 4:
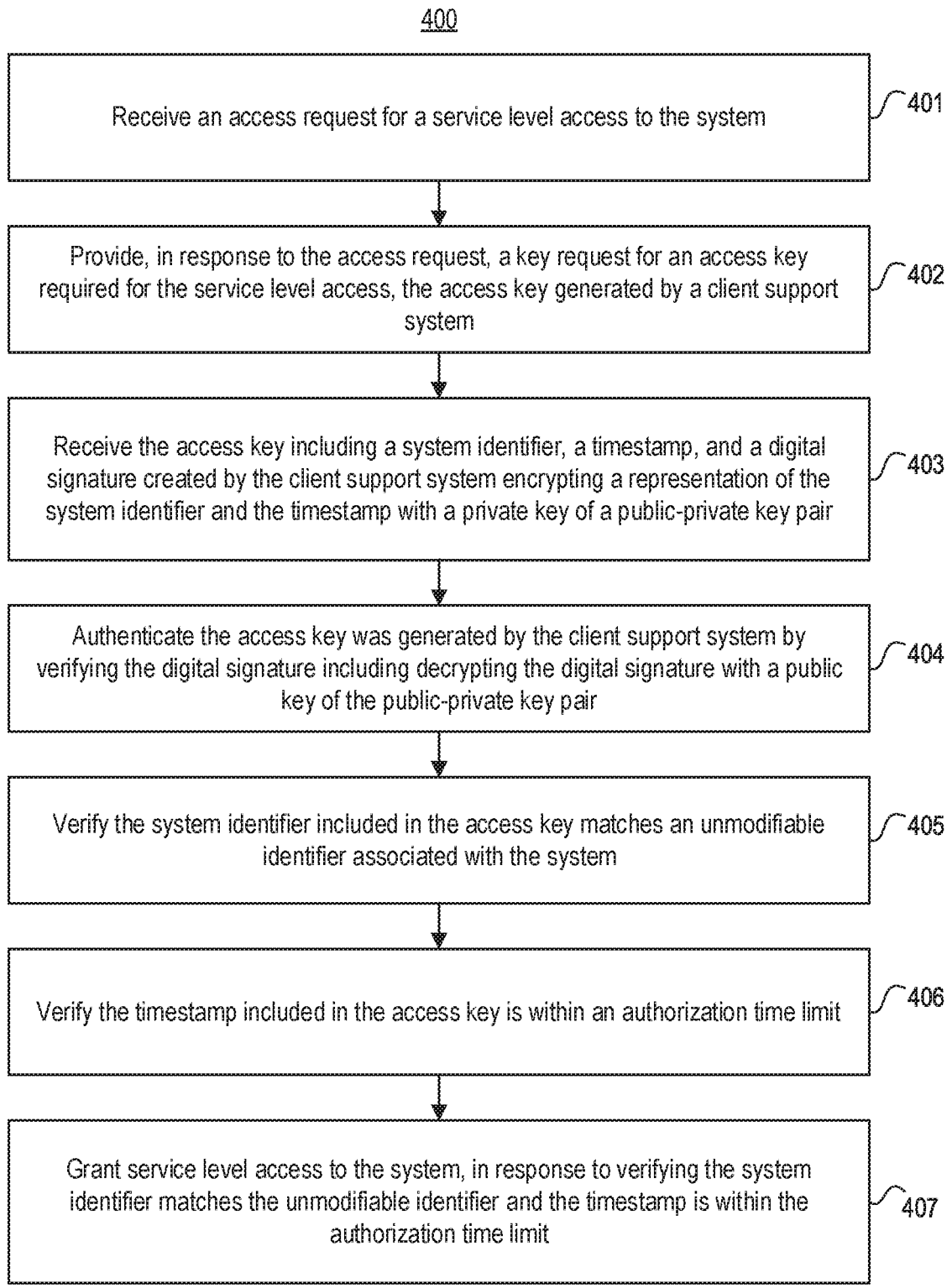
FIG. 4 is a flow diagram illustrating an example method of granting access to a system using a specialized access key according to one or more embodiments of the disclosure.

FIG. 4 is a flow diagram illustrating an example method of granting access to a system using a specialized access key according to one or more embodiments of the disclosure. Process 400 may use processing logic, which may include software, hardware, or a combination thereof. For example, process 400 may be performed by a system including one or more components described in operating environment 100.

In 401, the system (e.g. backup system 150) may receive an access request for a service level access to the system (or access via a service account). In some embodiments, the service level access may authorize additional privileges to the system. The access request may be received from a user (e.g. backup administrator) associated with a client (e.g. client system 110). For example, the user may be associated with a first access level to the system. For example, the first access level may include a client (or user) access level (or client account) that may restrict the user from accessing certain administrative privileges of the system. Accordingly, in some embodiments, the access request for the service level access may be received using a client level access that restricts the user from accessing the additional privileges.

In some embodiments, the access request may be received via a first interface associated with the system. For example, the first interface may include a limited interface (e.g. limited or restricted shell) that is provided as part of the client level access to the system. Accordingly, the limited interface may restrict a user from performing certain operations that require administrative privileges available to higher access levels such as the service access level. In some embodiments, the first interface may be provided by a backup application that operates in conjunction with the system.

In contrast, a second (or higher) access level may include a service level access (or service account) that authorizes additional (or enhanced) privileges to the system. For example, the service level access may include certain administrative privileges to the system. In some embodiments, the service level access may be provided by allowing the user to access a particular interface such as an operating system shell (e.g. unrestricted shell) of the system.

In 402, the system may provide a key request for an access key required for the service level access. In some embodiments, the key request may be provided in response to the access request. For example, the request may be provided to the user on the first interface. As described, the access key may generated by a client support system (e.g. client support system 180).

In 403, the system may receive the access key (e.g. access key 305). In some embodiments, the access key may be received from a user via the first interface. The user that provides the access key may be the same user that requested access (e.g. a backup administrator), or a different user (e.g. a support agent). As described, the access key may include a system identifier (e.g. system identifier 310), a timestamp (e.g. timestamp 320), and a digital signature (e.g. digital signature 330). For example, the access key may include a first text portion including the system identifier, a second text portion including a timestamp, and a third text portion including the digital signature. In some embodiments, the first text portion and the second text portion may be in the form of plaintext (e.g. unencrypted).

In some embodiments, the system identifier may include a serial number of the system (e.g. backup system) or a related component (e.g. backup appliance). In addition, the timestamp may include a time at which the client support system generates the access key. As described, the digital signature may be created by the client support system by encrypting a representation (e.g. message digest) of a message (e.g. message 325) including (or formed from) the first text portion and the second text portion with a private key of a public-private key pair. For example, the message may be a bit string created from combining (or concatenating) the first text portion (e.g. system identifier) and the second text portion (e.g. timestamp). In some embodiments, the representation (e.g. message digest) may be the output from inputting the message into a one-way function. For example, the one-way function may be a cryptographic hash function, and accordingly, the representation may be a hash value.

In 404, the system may authenticate the access key was generated by the client support system by verifying the digital signature. For example, verifying the digital signature may include decrypting the digital signature with a public key, issued to the system, of the public-private key pair. In some embodiments, the public key may be secured by the system. For example, the system may not expose the public key to any other component or any user (e.g. including a user with service level access).

To verify the digital signature, the system may decrypt the digital signature with its public key, to reveal (or expose) the message digest (e.g. hash value), and then verify the message digest by inputting the system identifier and timestamp (e.g. message) into the same cryptographic hash function used by the client support system. The resultant message digest determined by the system may then be compared to the message digest of the digital signature. If there is a match, the system can confirm the authenticity of the access key and the integrity of the contents (e.g. message) of the access key.

In 405, the system verify the system identifier included in the access key. For example, the system may verify the system identifier included in the access key matches an unmodifiable identifier associated with the system. In some embodiments, the unmodifiable identifier may be stored by the system. For example, the unmodifiable identifier may include a serial number for the system. For example, a hardware component of the system (e.g. server, or backup appliance) may be associated with a predetermined serial number (e.g. specified by the manufacturer of the component).

In 406, the system may verify the timestamp included in the access key. For example, the system may verify the timestamp included in the access key is within a predetermined authorization time limit. In some embodiments, the predetermined authorization time limit may be stored by the system. Accordingly, if the access key has expired, the system may deny service level access to the user.

In 407, the system may grant the user the service level access to the system, in response to verifying the system identifier and the timestamp. For example, access may be granted for a duration of the predetermined authorization time limit. In some embodiments, granting the user the service level access to the system may include providing a second interface allowing access to the administrative privileges. For example, the second interface may include an operating system interface such as a shell interface (e.g. Unix shell) that allows the user to execute operating system commands.

Figure 5:
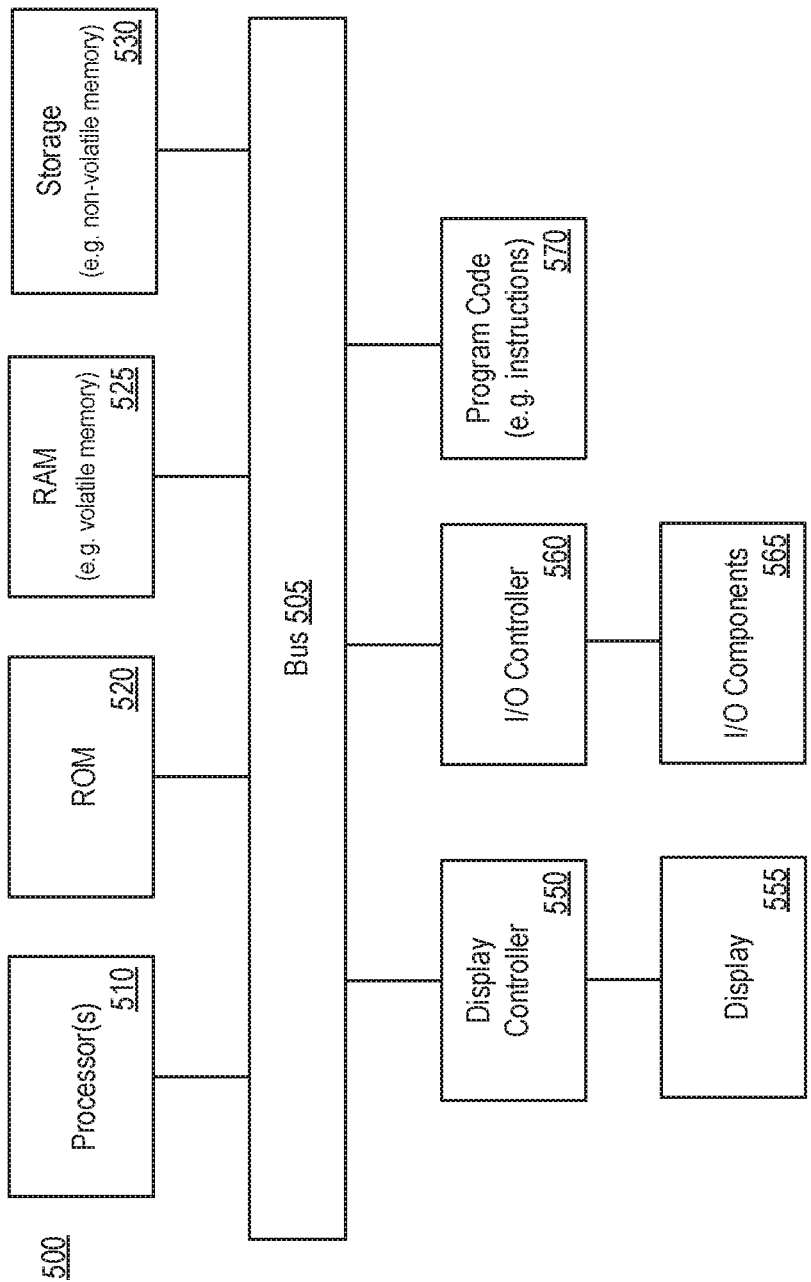
FIG. 5 is a block diagram illustrating an example computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. backup system 150, operating environment 100, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. backup system 150). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive, by the system and from a user via a first interface associated with a client level access to the system, an access request for a service level access to the system, the service level access authorizing additional privileges to the system beyond privileges authorized for the client level access;

provide, by the system in response to the access request and to the user via the first interface, a key request for an access key required for enabling an increase in user access from the client level access to the service level access, the access key generated by a client support system and independently verifiable by the system before granting the service level access to the user;

receive, from the user and via the first interface, the access key including a system identifier, a timestamp, and a digital signature created by the client support system encrypting a representation of both the system identifier and the timestamp with a private key of a public-private key pair, the representation including a modified version of text from the system identifier and modified text from the timestamp;

authenticate the access key was generated by the client support system by verifying the digital signature including decrypting the digital signature with a public key of the public-private key pair;

verify the system identifier included in the access key matches an unmodifiable identifier associated with the system;

verify the timestamp included in the access key is within an authorization time limit; and grant the user the user-requested increase in access from the client level access to the service level access to the system, in response to verifying the system identifier matches the unmodifiable identifier and the timestamp is within the authorization time limit.

2. The system of claim 1, wherein granting the user the service level access to the system includes providing a second interface allowing access to the administrative privileges.

3. The system of claim 2, wherein the second interface includes an operating system shell for the system.

4. The system of claim 1, wherein the timestamp includes a time at which the client support system generates the access key.

5. The system of claim 1, wherein the representation used for the digital signature is a hash value generated from a cryptographic hash function.

6. The system of claim 1, wherein the access key includes a first text portion including the system identifier, a second text portion including the timestamp, and a third text portion including the digital signature, and wherein the first text portion and the second text portion are provided as plaintext.

7. The system of claim 1, wherein the access request for the service level access is received using a client level access that restricts the user from accessing the additional privileges.

8. A method of authoring access to a system, comprising:

receiving, by the system and from a user via a first interface associated with a client level access to the system, an access request for a service level access to the system, the service level access authorizing additional privileges to the system beyond privileges authorized for the client level access;

providing, by the system in response to the access request and to the user via the first interface, a key request for an access key required for enabling an increase in user access from the client level access to the service level access, the access key generated by a client support system and independently verifiable by the system before granting the service level access to the user;

receiving, from the user and via the first interface, the access key including a system identifier, a timestamp, and a digital signature created by the client support system encrypting a representation of both the system identifier and the timestamp with a private key of a public-private key pair, the representation including a modified version of text from the system identifier and modified text from the timestamp;

authenticating, the access key was generated by the client support system by verifying the digital signature including decrypting the digital signature with a public key of the public-private key pair;

verifying the system identifier included in the access key matches an unmodifiable identifier associated with the system;

verifying the timestamp included in the access key is within an authorization time limit; and granting the user the user-requested increase in access from the client level access to the service level access to the system, in response to verifying the system identifier matches the unmodifiable identifier and the timestamp is within the authorization time limit.

9. The method of claim 8, wherein granting the user the service level access to the system includes providing a second interface allowing access to the administrative privileges.

10. The method of claim 9, wherein the second interface includes an operating system shell for the system.

11. The method of claim 8, wherein the timestamp includes a time at which the client support system generates the access key.

12. The method of claim 8, wherein the representation used for the digital signature is a hash value generated from a cryptographic hash function.

13. The method of claim 8, wherein the access key includes a first text portion including the system identifier, a second text portion including the timestamp, and a third text portion including the digital signature, and wherein the first text portion and the second text portion are provided as plaintext.

14. The method of claim 8, wherein the access request for the service level access is received using a client level access that restricts the user from accessing the additional privileges.

15. A computer program product comprising a non-transitory computer-readable medium having a computer-readable program code embodied therein to be executed by one or more processors, the program code including instructions to:

receive, by the system and from a user via a first interface associated with a client level access to the system, an access request for a service level access to the system, the service level access authorizing additional privileges to the system beyond privileges authorized for the client level access;

provide, by the system in response to the access request and to the user via the first interface, a key request for an access key required for enabling an increase in user access from the client level access to the service level access, the access key generated by a client support system and independently verifiable by the system before granting the service level access to the user;

receive, from the user and via the first interface, the access key including a system identifier, a timestamp, and a digital signature created by the client support system encrypting a representation of both the system identifier and the timestamp with a private key of a public-private key pair, the representation including a modified version of text from the system identifier and modified text from the timestamp;

authenticate the access key was generated by the client support system by verifying the digital signature including decrypting the digital signature with a public key of the public-private key pair;

verify the system identifier included in the access key matches an unmodifiable identifier associated with the system;

verify the timestamp included in the access key is within an authorization time limit; and grant the user the user-requested increase in access from the client level access to the service level access to the system, in response to verifying the system identifier matches the unmodifiable identifier and the timestamp is within the authorization time limit.

16. The computer program product of claim 15, wherein granting the user the service level access to the system includes providing a second interface allowing access to the administrative privileges.

17. The computer program product of claim 16, wherein the second interface includes an operating system shell for the system.

18. The computer program product of claim 15, wherein the timestamp includes a time at which the client support system generates the access key.

19. The computer program product of claim 15, wherein the representation used for the digital signature is a hash value generated from a cryptographic hash function.

20. The computer program product of claim 15, wherein the access key includes a first text portion including the system identifier, a second text portion including the timestamp, and a third text portion including the digital signature, and wherein the first text portion and the second text portion are provided as plaintext.

* * * * *